US005772567A

United States Patent [19]

Morando

[11] Patent Number: 5,772,567

[45] Date of Patent: Jun. 30, 1998

[54] COMPOSITE FURNACE ROLLS

[75] Inventor: Jorge A. Morando, Grosse Ile, Mich.

[73] Assignee: Alphatech, Inc., Cadiz, Ky.

[21] Appl. No.: 653,867

[22] Filed: May 28, 1996

Related U.S. Application Data

[63] Continuation-in-part of Ser. No. 287,647, Aug. 9, 1994, abandoned, Ser. No. 383,578, Feb. 3, 1995, Pat. No. 5,615,482, and Ser. No. 540,880, Oct. 11, 1995.

[51] Int. Cl.[6] .......... B23P 15/00

[52] U.S. Cl. .......... 492/54; 492/36

[58] Field of Search .......... 164/448; 492/35, 492/36, 54

[56] References Cited

U.S. PATENT DOCUMENTS

| | | | |
|---|---|---|---|
| 3,845,534 | 11/1974 | Kusters et al. | 492/36 |
| 5,411,462 | 5/1995 | Link | 492/54 |
| 5,498,837 | 3/1996 | Yamashita | 492/54 |

FOREIGN PATENT DOCUMENTS

| | | | |
|---|---|---|---|
| 0123958 | 8/1982 | Japan | 164/448 |
| 005549 | 4/1983 | Japan | 164/448 |
| 0055552 | 4/1983 | Japan | 164/448 |
| 02211662 | 12/1983 | Japan | 164/448 |
| 0618181 | 8/1978 | U.S.S.R. | 164/448 |
| 1475746 | 4/1989 | U.S.S.R. | 492/54 |

*Primary Examiner*—Irene Cuda
*Attorney, Agent, or Firm*—Charles W. Chandler

[57] ABSTRACT

A method for making either a ringless annealing furnace roll or a furnace roll having a series of spaced ring for supporting a metal strip being removed from an annealing furnace. Each ring is centrifugally cast with an outer rim of a steel alloy that is relatively insoluble with respect to the alloy of the strip being transferred from the furnace, and an inner liner of an alloy that can be readily welded to a roll. The inner liner material is fused to the rim material to form a composite ring.

8 Claims, 3 Drawing Sheets

COMPOSITE FURNACE ROLLS

CROSS-REFERENCE TO RELATED APPLICATIONS

This application is a continuation-in-part of application Ser. No. 08/287,647, filed Aug. 9, 1994, for "Heat Treating, Annealing and Tunnel Furnace Rolls", now abandoned application Ser. No. 08/383,578, filed Feb. 3, 1995, for "Composite Centrifugally Cast Furnace Roll Rings for Furnace Rolls and Method for Making Same", now U.S. Pat. No. 5,615,482 and application Ser. No. 08/540,880, filed Oct. 11, 1995, for "Heat Treating Annealing and Tunnel Furnace Rolls".

BACKGROUND OF THE INVENTION

This invention is related to rings for furnace rolls and to a ringless furnace roll, and more particularly to a composite roll, and a composite ring each having a rim that is cast of a material that is relatively insoluble with respect to the steel strip being transferred from the furnace, and an inner liner of a material having different solubility characteristics than the rim. The liner is fused to the rim.

In my U.S. Pat. No. 5,338,280, issued Aug. 16, 1994, for "Annealing and Tunnel Furnace Rolls", I disclosed a novel furnace roll for transferring a heated steel alloy strip from an annealing furnace. A series of spaced rings are welded to the roll body. The alloy of the rings is selected so as to be relatively non-weldable with respect to the alloy of the heated strip. The reason is to reduce the usual pick-up or material transfer between the roll and the strip caused by the tendency of the strip material to adhere to the rings at high temperatures, thus reducing the life of the rings and the quality of the strip.

However, a ring material that is relatively insoluble with the strip material is usually difficult to weld to the roll body because of its' high adhesion and solubility resistance.

SUMMARY OF THE INVENTION

The broad purpose of the present invention is to provide a composite furnace roll and a composite ring formed of different steel alloys. The ring has a rim material of a steel alloy selected with a very low surface energy, high hardness and relative insolubility (high ratio of covalent bonded particles) with the steel strip being transferred. The ring has an inner liner of a second alloy that can be readily welded to the roll. The ring is preferably formed in a centrifugal casting process in which the rim alloy is first cast to form a tubular structure. The liner is then centrifugally cast on the inside of the tubular structure while it is still sufficiently hot so the two materials fuse together, forming an integral composite tube. The tube is removed from the casting apparatus and sliced into a series of rings which may be readily individually welded onto the furnace roll.

A further object is to provide a ringless furnace roll formed of two tubular structures fused together, the outer structure being relatively insoluble with the strip material. The ringless roll is formed in a similar procedure except the combined tubular structure is not sliced into rings.

Another object is to provide a composite ringless roll in which the rim alloy is chosen to best suit the furnace atmosphere, that is, whether nitrogen or air.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like reference parts throughout the several views, and in which.

DESCRIPTION OF THE PREFERRED EMBODIMENT

Figure 1:
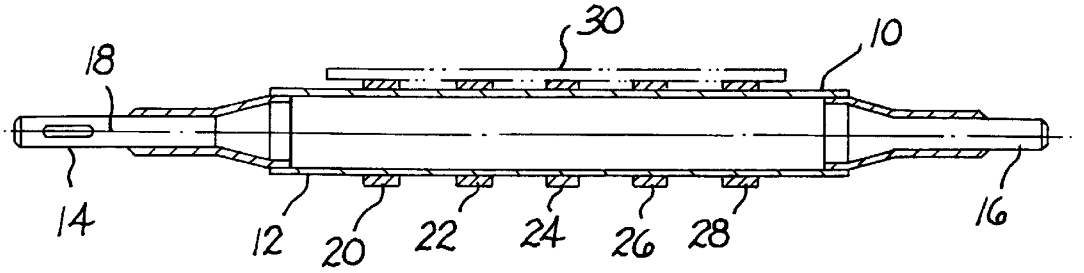
FIG. 1 is a longitudinal sectional view of a furnace roll illustrating the preferred embodiment of the invention with a steel strip being illustrated in phantom.

Referring to the drawings, FIG. 1 illustrates a preferred annealing furnace roll 10 illustrating the invention. The roll is illustrated in section to show a tubular body 12 having a pair of shaft ends 14 and 16 adapted to support the roll for rotation about axis 18. In use, the roll has its shaft ends mounted in a pair of bearings, not shown.

The roll body, for illustrative purposes, supports five wear rings 20, 22, 24, 26, and 28, which are spaced at regular intervals along the length of the roll. The five rings are preferably welded to the roll, however, they could be attached by other suitable means so that they can be replaced without having to replace the entire roll assembly. The outer rims of the rings typically support a generally flat, hot steel strip 30 which is transferred along a series of rolls from an annealing furnace under relatively high temperature conditions, as is well known to those skilled in the art.

For illustrative purposes, strip 30 is a stainless steel (300 or 400 series) alloy steel.

Tubular body 12 is formed of a Nicrom 72 steel selected because of its strength at high operating temperatures. Nicrom 72 steel is available from ALPHATECH, Inc. of Fraser, Mich.

The wear rings are identical. Each wear ring has a 12" outside diameter and a width of 1¾". A distance of about 10" separates adjacent rings.

Figure 4:
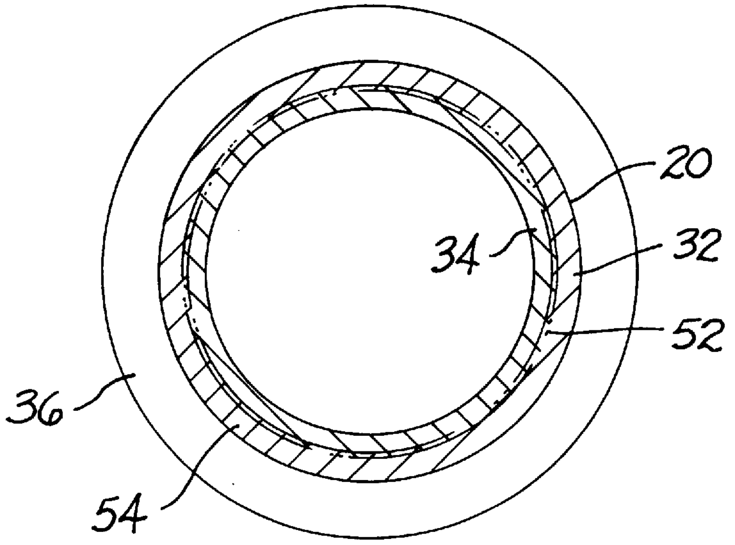
FIG. 4 is an enlarged cross-sectional view of the mold and the composite tubular structure.

FIG. 4 illustrates a typical ring 20. Ring 20 has an outer rim 32 formed of a steel alloy relatively insoluble with the material of the steel strip. For the particular alloy of strip 30, the rim material may be Nicrom 8 which has a very low surface energy, and is very hard and relatively insoluble with respect to the strip material. Because of this adhesion resistance, Nicrom 8 also has poor weldability with respect to the alloy of roll body 12. The surface of the roll body refuses to stick to the strip material. For this reason, ring 20 has an inner liner 34 formed of a material chosen to have: a) good welding characteristics with respect to the roll material; b) the same or nearly the same coefficient of expansion as the roll material. That is, it can be readily welded to the roll body to form an integral structure. For illustrative purposes, liner 34 is formed of Nicrom 72, another ALPHATECH product.

Figure 2:
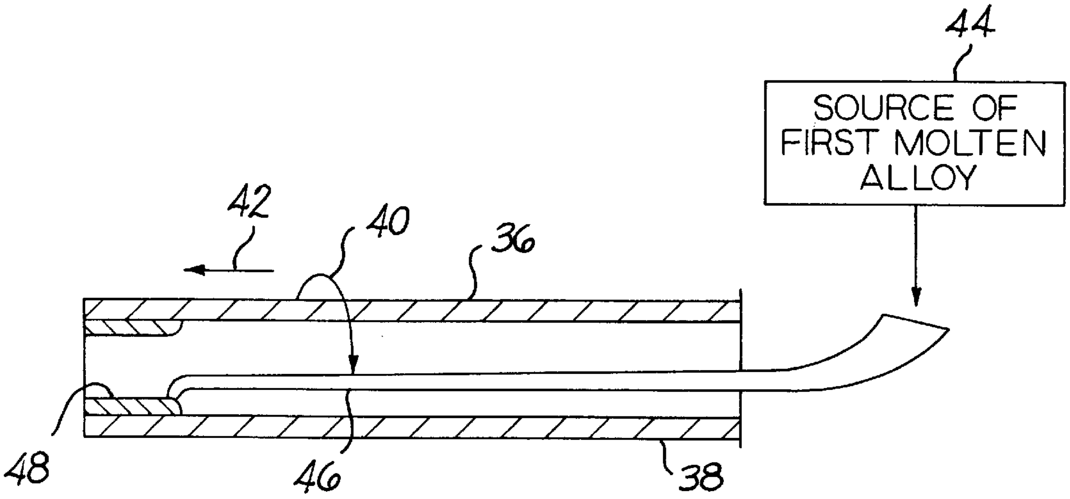
FIG. 2 is a schematic view of a centrifugal casting process illustrating the first alloy being centrifugally cast to form an outer layer.
Figure 3:
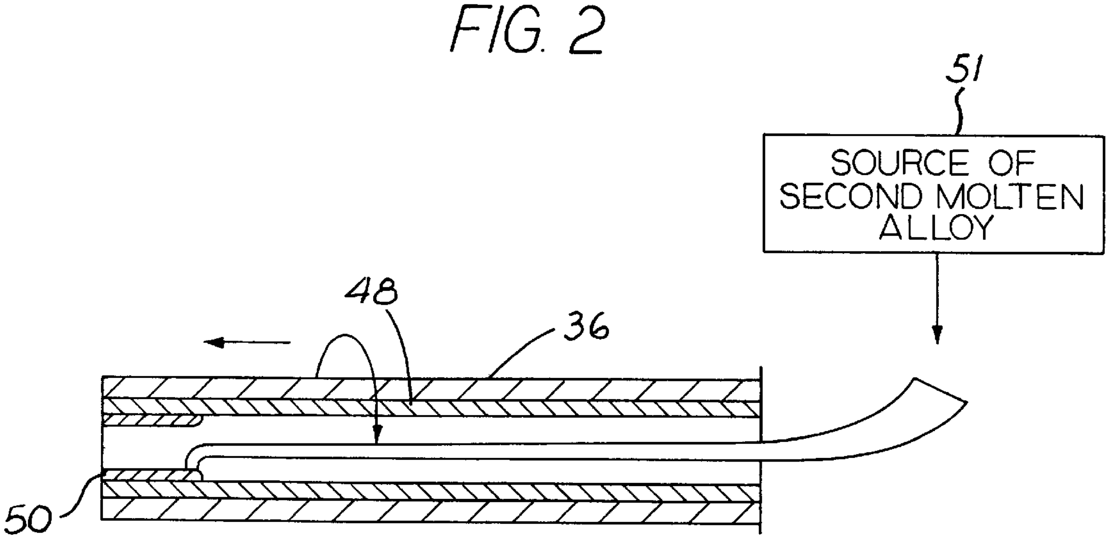
FIG. 3 is a view showing a second steel alloy being centrifugally cast on the inside of the outer layer.
Figure 5:
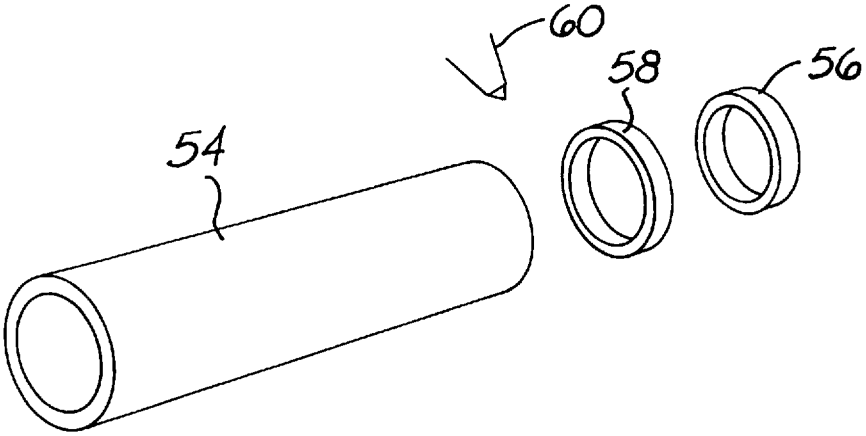
FIG. 5 is a view illustrating the composite tubular structure being cut to form a series of individual rings.

The rim material may be joined with the liner material in a fusion process by centrifugally casting the rings as illustrated in FIGS. 2, 3 and 5.

A conventional centrifugal casting apparatus is illustrated at 36 and comprises an elongated tubular mold 38 which is rotated about its longitudinal axis in the direction of arrow 40, as the mold is advanced in the direction of arrow 42, along the longitudinal axis of the mold.

Initially, a source of molten steel 44 delivers the molten rim alloy through a feed pipe 46 which delivers it to the inside surface of the mold as it is being rotated and advanced in the direction of arrow 42, forming an outer tubular layer 48 on the inside of the mold. The molten alloy may be about 2500° fahrenheit. The mold is rotated at 1000 rpm and advanced in the direction of arrow 42 at approximately one foot per second, depending on the thickness of the metal layer being deposited.

This process is continued, as illustrated in FIG. 3, until the outer layer of rim material has formed a tubular body extending the length of the mold. The molten tubular body has about a ⅜" wall thickness. The temperature of the inner annular portion of the outer layer is important. While the inner face of the outer layer is still relatively hot, for example, 2000° fahrenheit, an inner layer 50 of the liner alloy is delivered from a source 51 to the inner surface of the tubular body. As the inner layer is deposited along the length of the tubular body, the two molten alloys fuse together at the interface between the two layers, joining the two layers in a tubular joint, having a total thickness of about ¾" to 1", as illustrated in FIG. 4 at 52.

It is important to introduce the inner layer into the casting process at the proper time to prevent any separation of the inner liner material and the rim material which may occur if the liner material cools too fast.

Referring to FIG. 5, the composite tubular body 54 is removed from mold 36, and permitted to cool. Body 54 is then introduced into a suitable rotating apparatus and individual rings such as at 56 and 58 cut from the end of the tubular body by a carbide saw 60. The rings are then slid onto the end of roll body 12, and replaceably welded in position.

Thus, it is to be understood that I have described a composite wear ring for an annealing furnace roll having an outer rim material which is relatively insoluble with respect to the strip alloy. The alloy of liner 34 has good welding characteristics with respect to roll 12.

In some situations, when the distance between rolls is over 3"–4", then the steel strip tends to sag between adjacent furnace rolls. Consequently, it is desirable to provide a greater friction surface than is available using a series of rings.

Figure 6:
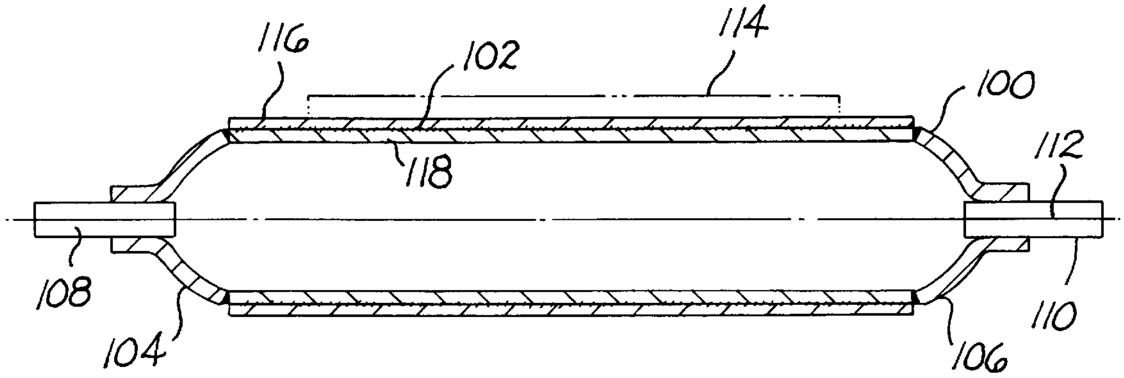
FIG. 6 is a longitudinal sectional view of a composite ringless furnace roll illustrating the invention.
Figure 7:
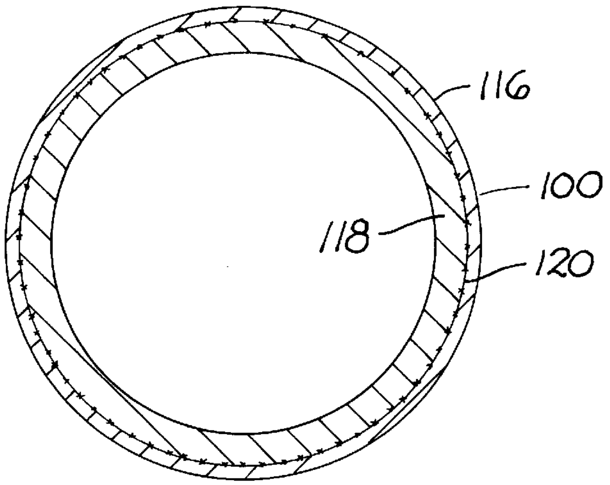
FIG. 7 is an enlarged cross-sectional view of the embodiment of FIG. 6.

FIGS. 6 and 7 illustrate a ringless roll 100 illustrating the invention. Roll 100 has a composite tubular body 102 connected by a pair of bell-shaped sections 104 and 106 to a pair of end shafts 108 and 110, respectively. The shafts are axially aligned and adapted to support the roll for rotation about axis 112. The roll supports a strip 114 having a cross-section illustrated in phantom. The strip may be of a stainless steel (300 or 400 series) alloy.

Body 102 is centrifugally cast in the same manner as described in the embodiment of FIGS. 1–3, and comprises a centrifugally cast outer layer 116 having a thickness normally of about ⅛" to ⅜" thick. Layer 116 is formed of an alloy relatively insoluble with the material of strip 114, that is, it has a relatively low adhesion characteristic with respect to the strip. The body has an inner tubular roll section 118 having a thickness chosen to accommodate the stresses generated by the strip load, the roll geometry and the furnace operating temperature. It will normally be several times thicker than outer layer 116.

Roll section 118 is centrifugally cast inside layer 116 while the inner face of layer 116 is still sufficiently hot so that the alloy of roll 118 fuses with layer 116 along an interface generally illustrated by a series of x's in FIGS. 6 and 7 at 120. Layer 116 may be of a Nicrom 8 steel available from ALPHATECH, Inc. of Fraser, Mich., which is relatively insoluble with respect to the strip being carried, that is the layer has a very low surface energy and is very hard. For these characteristics, roll section 118 is formed of a Nicrom 72.

Thus, roll section 118 can be readily welded, for example, to bell-shaped sections 104 and 106 after the roll has cooled from the casting process. The composite roll has an outer surface having a low adhesion characteristic with respect to the particular strip being carried, while the inner surface has sufficient strength to accommodate the strip load and can be readily welded to the balance of the roll assembly.

Further, the ringless roll has a greater frictional area for generating the necessary friction force to raise the sagging strip as it is carried from roll to roll.

I have found that the preferred composite rolls can be satisfactorily used at a higher temperature than is normally used in annealing furnaces. For example, the furnaces can now be used to heat the strip material, up to 2000° to 2200° fahrenheit. The advantage of using a higher temperature is that you can process the steel faster, thereby increasing production.

I have found that by carefully selecting the composition of the roll alloy, the roll picks up less material from the strip material. The pick-up is commonly measured by noting the increase in the roll diameter. I have found that a conventional roll which will experience a diameter increase of 0.024", during the comparable time that my improved roll experiences a diameter increase of only 0.0005". One advantage of reduced pick-up is that it reduces the frequency that the roll surface has to be refinished. The preferred composite roll and rings can be found using techniques other than centrifugal casting.

I have increased the percentage of aluminum for rolls used at higher temperatures. Aluminum forms a relatively non-weldable alloy, and also provides an increase in hardness.

The tungsten component has shown some tendency to become attacked at higher temperatures. I have found that by replacing part of the tungsten with niobium, which is very stable up to 3000° fahrenheit, reduces the amount of tungsten that is attackable. The nickel percentage reduction reduces "pick-up" and also gives the roll higher corrosion resistance. Tests have shown that this improved composition provides no oxidation and relatively little pick-up by the roll, whether the roll is formed through a centrifugal process or by another static process. The components selection depends upon whether the atmosphere is carburizing, air, or nitrogen. If I make a roll to be used in a nitrogen atmosphere I increase the nickel component as well as the carbon. If I use the roll in air, the aluminum percentage is increased. Preferably the rolls are made according to the following formula:

| % | | % |
|---|---|---|
| 20.0< | Ni | <40.0 |
| 20.0< | Cr | <40.0 |
| 0.4< | C | <1.2 |
| 2.0< | W | <10.0 |
| 0.5< | Mo | <1.5 |
| 4.0< | Co | <30.0 |
| 0.8< | Si | <2.5 |
| 1.0< | Mn | <2.0 |
| 0.0< | Nb | <4.0 |
| 0.0< | Al | <10.0 |
| 0.0< | B | <2.0 |

Tests that have been conducted with such rolls show negligible pick-up or wear.

A typical test of a roll used in a nitrogen atmosphere had the composition:

| $N_2$ | |
|---|---|
| Ni | 30 |
| Cr | 20 |
| C | 1.0 |
| W | 8.0 |
| Mo | 3.0 |
| Co | 20.0 |
| Si | 2.0 |
| Mn | 2.0 |
| Nb | 2.0 |
| Al | .50 |
| B | 1.0 |

A roll tested in an air atmosphere had the following composition:

| Air | |
|---|---|
| Ni | 30.0 |
| Cr | 30.0 |
| C | .80 |
| W | 6.0 |
| Mo | 2.0 |
| Co | 15.0 |
| Si | 2.0 |
| Mn | 2.0 |
| Nb | 2.0 |
| Al | 2.5 |
| B | 1.0 |

The best performance in air to date was by a roll having the following composition:

| | |
|---|---|
| Ni | 30.0 |
| Cr | 20.0 |
| C | 1.0 |
| W | 8.0 |
| Mo | 3.0 |
| Co | 15.0 |
| Si | 2.0 |
| Mn | 2.0 |
| Nb | 2.0 |
| Al | 2.5 |
| B | 1.0 |

These rolls were tested using the equivalent of one year normal usage at 2050° fahrenheit. There was no evidence of any adhesion or oxidation.

Accordingly, it is to be understood that I have described an improved annealing roll which can be used to either form wear rings or for a ringless roll.

Having described my invention,

I claim:

1. A roll for transferring a flat heated strip of a first steel alloy from an annealing furnace, comprising:

an elongated tubular body (118) having a longitudinal axis, said tubular body being formed of a second steel alloy having a relatively high yield strength at elevated temperatures in the vicinity of 2000° F., said second steel alloy having a composition such that said second steel alloy is readily weldable;

shaft-attachment end caps (104, 106) welded to said tubular body;

an annular sleeve (116) encircling said tubular body; said annular sleeve having essentially the same length as said tubular body to form a continuous support surface for the aforementioned flat hated strip while the tubular body is rotating around its longitudinal axis; said annular sleve being formed of a third steel alloy that is relatively insoluble with respect to the first steel alloy;

said annular sleeve being joined to said tubular body by a continuous fused annular joint that includes said second alloy and said third alloy;

said tubular body and said annular sleeve forming a unitary two layer roll wherein the tubular body defines the inner surface of the roll and the annular sleeve forms the outer surface of the roll.

2. A roll as defined in claim 1, wherein said tubular body has a radial thickness that is several times the radial thickness that is several times the radial thickness of said annular sleeve.

3. A roll as defined in claim 1, wherein said tubular body is formed by centrifugally casting a metal layer of the second alloy onto said annular sleeve while said sleeve is in a heated condition sufficient to cause the engaged surfaces of the second and third alloys to be in the molten condition.

4. A roll as defined in claim 1, wherein the flat heated strip is formed of a stainless steel alloy, and said annular sleeve is formed of a third steel alloy containing significant percentages of nickel, chromium, and cobalt.

5. A roll as defined in claim 1, wherein said annular sleeve is formed of a third steel alloy containing significant percentages of nickel, chromium and cobalt; said third steel alloy further comprising carbon in a weight percentage from 0.4% to 1.2%.

6. A roll as defined in claim 1, wherein said third steel alloy includes nickel in a weight percentage from 20% to 40%, chromium in a weight percentage from 20% to 40% cobalt in a weight percentage from 4% to 30%, and carbon in a weight percentage from 0.4% to 1.2%.

7. A roll as defined in claim 1, wherein said third steel alloy has approximately the following composition, by weight:

| | |
|---|---|
| nickel | 20–40% |
| chromium | 20–40% |
| carbon | 0.4–1.2% |
| tungsten | 2.0–10% |
| molybdenum | 0.5–1.5% |
| cobalt | 4.0–30% |
| silicon | 0.8–2.5% |

-continued

| | |
|---|---|
| manganese | 1.0–2% |
| niobium | 0–4% |
| aluminum | 0–10% |
| boron | 0–2% |
| iron | balance |

8. A roll as defined in claim 1, wherein said third steel alloy has approximately the following composition, by weight:

| | |
|---|---|
| nickel | 30% |
| chromium | 20% |
| carbon | 1.% |
| tungsten | 8.% |
| molybdenum | 3.% |
| cobalt | 15% |
| silicon | 2.% |
| niobium | 2.% |
| aluminum | 2.5% |
| boron | 1.% |
| iron | balance |

* * * * *

UNITED STATES PATENT AND TRADEMARK OFFICE

CERTIFICATE OF CORRECTION

PATENT NO. : 5,772,567

DATED : June 30, 1998

INVENTOR(S) : Jorge A. Morando

It is certified that error appears in the above-identified patent and that said Letters Patent is hereby corrected as shown below:

column 3, line 49 of the Patent, delete "3"-4" and insert thereinstead --- 3'-4' ---.

Signed and Sealed this

Twenty-second Day of December, 1998

Attest:

BRUCE LEHMAN

Attesting Officer

Commissioner of Patents and Trademarks